(12) United States Patent
Yamada

(10) Patent No.: US 7,939,985 B2
(45) Date of Patent: May 10, 2011

(54) MOTOR AND METHOD FOR MANUFACTURING ROTOR UNIT OF THE MOTOR

(75) Inventor: Yosuke Yamada, Kyoto (JP)

(73) Assignee: Nidec Corporation, Kyoto (JP)

( * ) Notice: Subject to any disclaimer, the term of this patent is extended or adjusted under 35 U.S.C. 154(b) by 87 days.

(21) Appl. No.: 12/401,738

(22) Filed: Mar. 11, 2009

(65) Prior Publication Data
US 2009/0230801 A1    Sep. 17, 2009

(30) Foreign Application Priority Data
Mar. 12, 2008    (JP) .................... 2008-062310

(51) Int. Cl.
*H02K 15/03*    (2006.01)
*H02K 1/27*    (2006.01)

(52) U.S. Cl. ........ 310/216.114; 310/156.53; 310/156.57

(58) Field of Classification Search ............ 310/156.53, 310/156.56, 216.048, 216.114, 124, 216.125, 310/216.129, 216.133, 156.58
See application file for complete search history.

(56) References Cited

U.S. PATENT DOCUMENTS

| | | | | |
|---|---|---|---|---|
| 2,059,518 A | * | 11/1936 | Harley | 310/156.53 |
| 3,202,851 A | * | 8/1965 | Dehlendorf et al. | 310/216.048 |
| 5,142,178 A | * | 8/1992 | Kloster et al. | 310/216.048 |
| 5,142,179 A | * | 8/1992 | Nakamura et al. | 310/216.133 |
| 6,234,767 B1 | * | 5/2001 | Takeda et al. | 417/355 |
| 6,437,474 B1 | * | 8/2002 | Chu | 310/156.53 |
| 7,608,966 B2 | * | 10/2009 | Mizutani et al. | 310/156.53 |
| 7,772,734 B2 | * | 8/2010 | Mizutani et al. | 310/156.53 |

FOREIGN PATENT DOCUMENTS

| | | | | |
|---|---|---|---|---|
| JP | 2002142392 A | * | 5/2002 | |
| JP | 2003-102151 A | | 4/2003 | |
| JP | 2006-050816 A | | 2/2006 | |
| JP | 2007-037202 A | | 2/2007 | |

* cited by examiner

*Primary Examiner* — Tran N Nguyen
(74) *Attorney, Agent, or Firm* — Keating & Bennett, LLP

(57) ABSTRACT

In a rotor unit of a motor, field magnets are inserted into respective magnet holding holes of a rotor core. End plates are arranged on the upper and lower end surfaces of the rotor core to cover the magnets holding holes. Each of the end plates preferably has three bent portions extending perpendicular or substantially perpendicular to the radial direction, the three bent portions being arranged circumferentially. The bent portions are preferably formed through press working such that they are protruded toward the rotor core. The rotor core includes end plate fixing holes. End plates are preferably fixed to the rotor core by press-fitting the bent portions into the respective end plate fixing holes while allowing side surfaces of the bent portions to make contact with inner surfaces of the end plate fixing holes. Accordingly, the end plates can easily be fixed to the rotor core without increasing the axial size of the rotor unit.

9 Claims, 10 Drawing Sheets

MOTOR AND METHOD FOR MANUFACTURING ROTOR UNIT OF THE MOTOR

BACKGROUND OF THE INVENTION

1. Field of the Invention

The present invention relates to an electric motor in which a field magnet is held within a rotor core.

2. Description of the Related Art

An electric motor for motor vehicles such as cars and the like is used in a vibrating environment and therefore is required to exhibit increased reliability. An IPM (Interior Permanent Magnet) motor in which field magnets employed in a rotor unit of the motor are held within a rotor core to prevent radial movement thereof has often been used. In the IPM motor, the radial and circumferential movement of the field magnets is prevented by the rotor core. However, a need exists to additionally provide a means for preventing axial movement of the field magnets.

For example, in a conventional motor manufacturing method, permanent magnets are shrink-fitted into respective holes of a rotor core. Thereafter, end plates are attached to a rotor so that the protrusions formed in the end plates can make contact with the axial end surfaces of the permanent magnets. Then the end plates are fixed to the rotor by fastening means such as caulking pins, bolts and nuts.

Reduced size and increased output power are required in an electric motor for motor vehicles. In a conventional electric motor, however, the axial size of a rotor becomes greater because the end plates are fixed to the opposite end portions of the rotor by bolts or the like.

SUMMARY OF THE INVENTION

In order to overcome the problems described above, preferred embodiments of the present invention provide a motor including a stator unit having an annular armature and a substantially columnar rotor unit inserted into the armature. The rotor unit includes a rotor core having a plurality of magnet holding holes, a plurality of field magnets inserted into the magnet holding holes and an end plate arranged on a first axial end surface of the rotor core. The rotor core has a plurality of end plate fixing holes defined on the first axial end surface. The end plate has a plurality of bent portions. The end plate is fixed to the first axial end surface by, for example, press-fitting the bent portions to the end plate fixing holes.

In accordance with another preferred embodiment of the present invention, there is provided a method for manufacturing a rotor unit of an electric motor, including the steps of: a) inserting a plurality of field magnets into respective ones of a plurality of magnet holding holes of a rotor core; and b) fixing an end plate to a first axial end surface of the rotor core. In the step b), the end plate is fixed to the first axial end surface by press-fitting a plurality of bent portions of the end plate to a plurality of end plate fixing holes of the rotor core.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
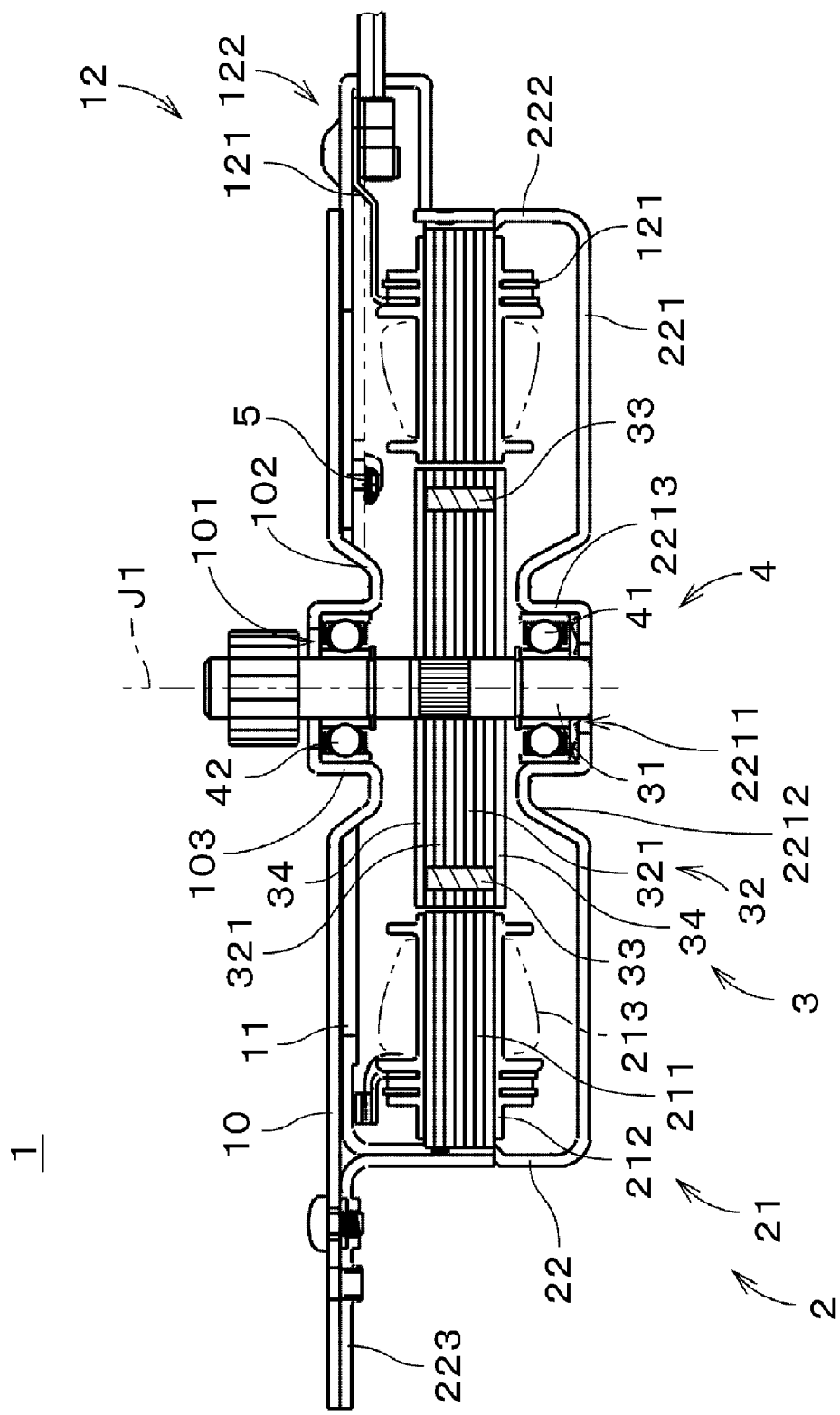
FIG. 1 is a section view schematically showing a motor in accordance with a preferred embodiment of the present invention.

FIG. 1 is a view schematically showing an electric motor 1 in accordance with a preferred embodiment of the present invention. FIG. 1 also shows some elements positioned rearwards of the cross-sectional plane. The cross-section is shown with no hatching. The motor 1 is preferably mounted to a car and used in a power window, a power slide door and so forth. The motor 1 has a low-profile structure in which the height measured along a central axis J1 is smaller than the outer diameter. As shown in FIG. 1, the motor 1 is an inner rotor type motor. The motor 1 preferably includes a stator unit 2, a rotor unit 3, a bearing mechanism 4, a sensor unit 5, a top cover 10, a resin plate 11 and a wiring unit 12. The stator unit 2 preferably includes an annular armature 21 coaxial with the central axis J1. The rotor unit 3 is preferably arranged into a substantially columnar shape and inserted into the armature 21. The bearing mechanism 4 supports the rotor unit 3 so that the rotor unit 3 can rotate relative to the stator unit 2 about the central axis J1. The sensor unit 5 is arranged to detect the rotational position of the rotor unit 3. The top cover 10 is arranged to cover the top surface of the armature 21. The resin plate 11 is arranged into a substantially flat shape and is positioned above the armature 21. The wiring unit 12 is connected to the armature 21.

The rotor unit 3 preferably includes a shaft 31, a substantially columnar rotor core 32, a plurality of field magnets 33 arranged within the rotor core 32 and end plates 34 attached to the upper and lower surfaces of the rotor core 32. The stator unit 2 preferably includes the armature 21 and a stator cover 22 having a substantially cylindrical shape with a closed bottom. The stator cover 22 and the top cover 10 preferably define a space within which the armature 21 is accommodated. In the following description, the side on which the top cover 10 lies along the central axis J1 will be referred to as "upper" and the side on which the stator cover 22 lies along the central axis J1 will be called "lower" for the sake of convenience. However, the central axis J1 needs not to coincide with the direction of gravity.

The armature 21 preferably includes a core 211, insulators 212 arranged to cover the core 211 and coils 213 wound on the insulators 212. The core 211 is preferably formed by laminating a plurality of flat silicon steel plates one above another. The wiring unit 12 preferably includes bus bars 121 arranged on the upper and lower surfaces of the armature 21. The bus bars 121 serve as flow paths through which a driving current is supplied to the armature 21. The bus bars 121 arranged on the upper surface of the armature 21 are preferably covered with the resin plate 11 and connected to an external power source by a connector portion 122 protruding outwards from the stator cover 22. The bearing mechanism 4 is preferably defined by a plurality of ball bearings 41 and 42 arranged along the central axis J1. The ball bearings 41 and 42 are respectively held in place by a bearing retainer 2213 provided in the substantially central region of the stator cover 22 and a bearing retainer 103 provided in the substantially central region of the top cover 10. The sensor unit 5 preferably includes a circuit board and a sensor, i.e., a magnetic field detecting element, such as a Hall element or the like. The sensor unit 5 serves to detect the rotational position of the rotor unit 3 relative to the armature 21.

Figure 2:
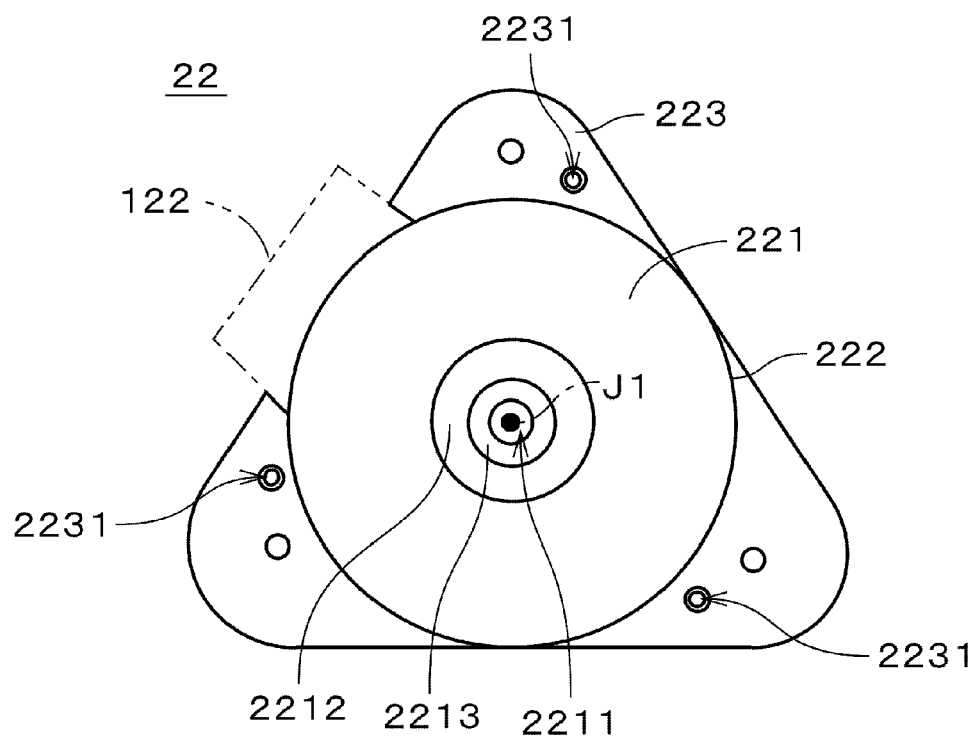
FIG. 2 is a bottom view schematically showing a stator cover in accordance with a preferred embodiment of the present invention.

FIG. 2 is a bottom view schematically showing the stator cover 22 of the stator unit 2. As shown in FIGS. 1 and 2, the stator cover 22 has a disk-shaped bottom portion 221, a side wall portion 222 and a flange portion 223. The bottom portion 221 has a hole portion 2211 arranged in the substantially central region thereof, the shaft 31 being inserted into the hole portion 2211, and an annular ridge portion 2212 protruding upwards in a coaxial relationship with the central axis J1. the bearing retainer portion 2213 arranged to retain the ball bearing 41 of the bearing mechanism 4 in place is arranged in the inner region of the ridge portion 2212. The side wall portion 222 is defined in a substantially cylindrical shape to extend upwards from the outer circumference of the bottom portion 221. The flange portion 223 preferably has a substantially triangular shape. The flange portion 223 is provided with three corner portions having through-holes 2231 used in fastening the top cover 10 to the flange portion 223. The flange portion 223 and the side wall portion 222 are partially cut away at a position where the connector portion 122 is arranged.

Figure 3:
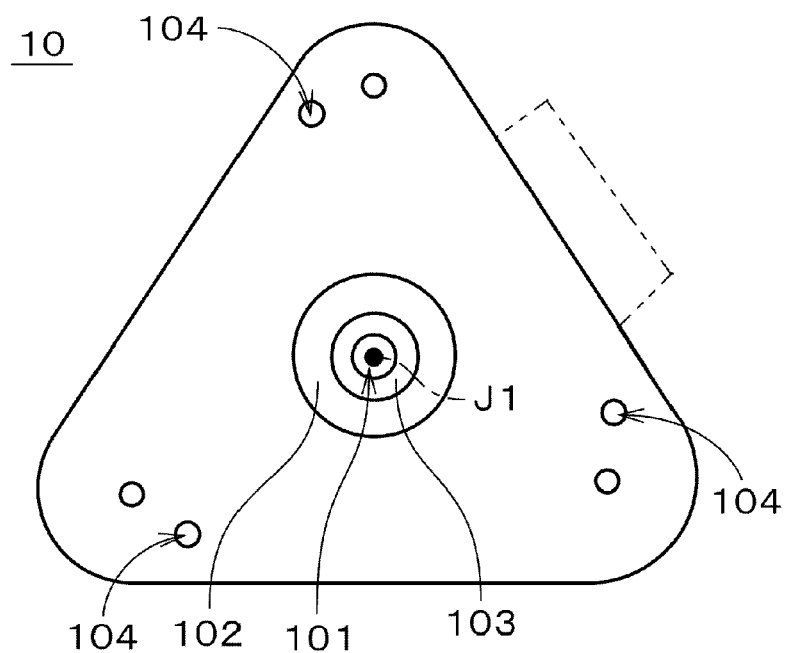
FIG. 3 is a plan view schematically showing a top cover in accordance with a preferred embodiment of the present invention.

FIG. 3 is a plan view schematically showing the top cover 10 that covers the upper surface of the armature 21. The top cover 10 has preferably a substantially triangular shape just like the flange portion 223 of the stator cover 22. Through-holes 104 are arranged at three points of the top cover 10 in alignment with the through-holes 2231 of the stator cover 22. As can be seen in FIGS. 1 and 3, the top cover 10 has a hole portion 101 arranged in the substantially central region thereof, the shaft 31 being inserted into the hole portion 101, and an annular ridge portion 102 protruding downwards around the hole portion 101. a bearing retainer portion 103 arranged to retain the ball bearing 42 of the bearing mechanism 4 in place is arranged in the inner region of the ridge portion 102.

Figure 4:
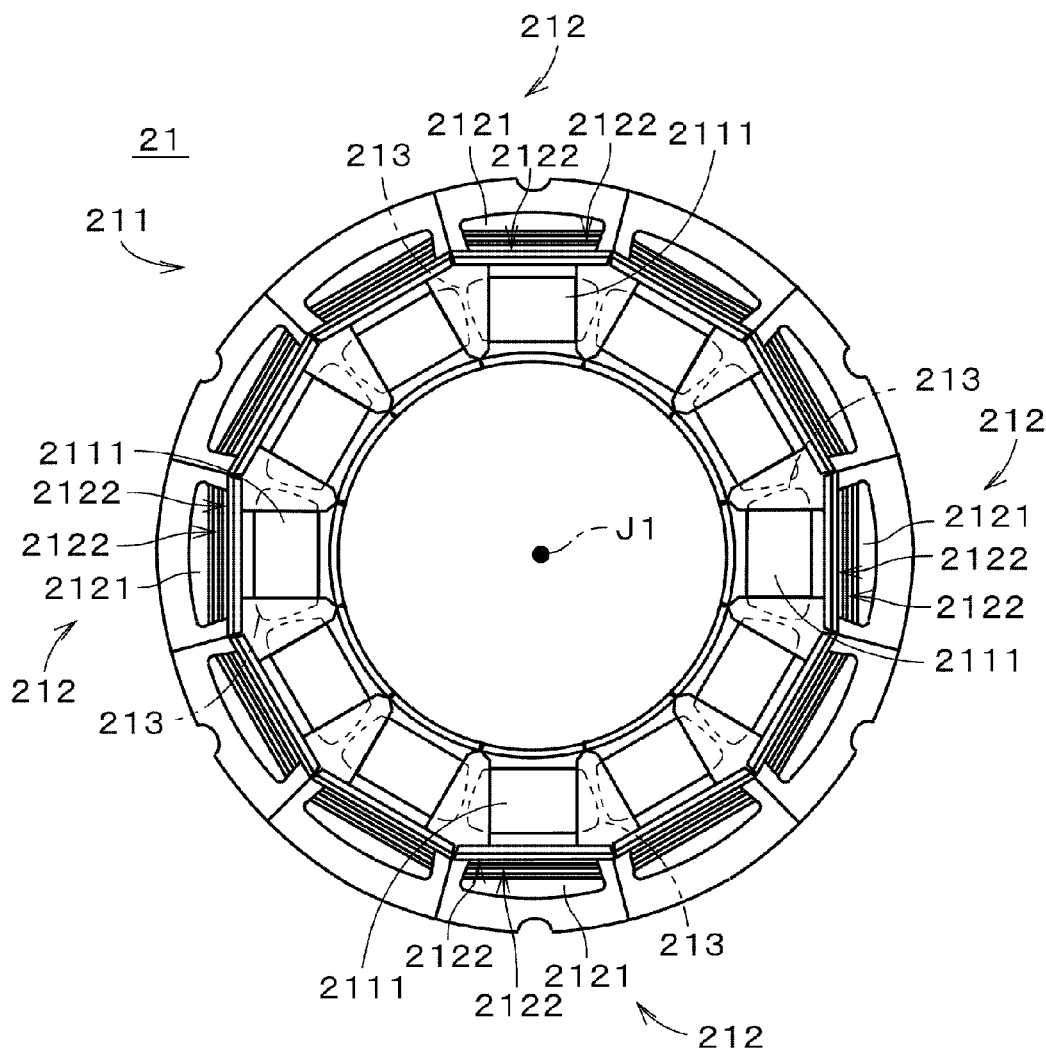
FIG. 4 is a plan view schematically showing an armature in accordance with a preferred embodiment of the present invention.

FIG. 4 is a plan view schematically showing the armature 21 before the bus bars 121 are installed. The coils 213 are indicated by double-dotted chain lines in FIG. 4. The core 211 includes twelve radially-extending teeth 2111 and a coreback connected to the respective teeth 2111 at the radial outer side of the latter. As shown in FIG. 4, the respective teeth 2111 are covered with the insulators 212, each of which includes two insulator parts 2121 having the shapes vertically inverted with respect to each other. Each of the coils 213 is preferably formed by winding a conductive wire on each of the insulators 212. In the region of each of the insulator parts 2121 lying radially outwards of each of the coils 213, two circumferentially-extending grooves 2122 are arranged side by side along the radial direction. The bus bars 121 of the wiring unit 12 are held in the grooves 2122 to supply an electric current to the coils 213 of the armature 21.

Figure 5:
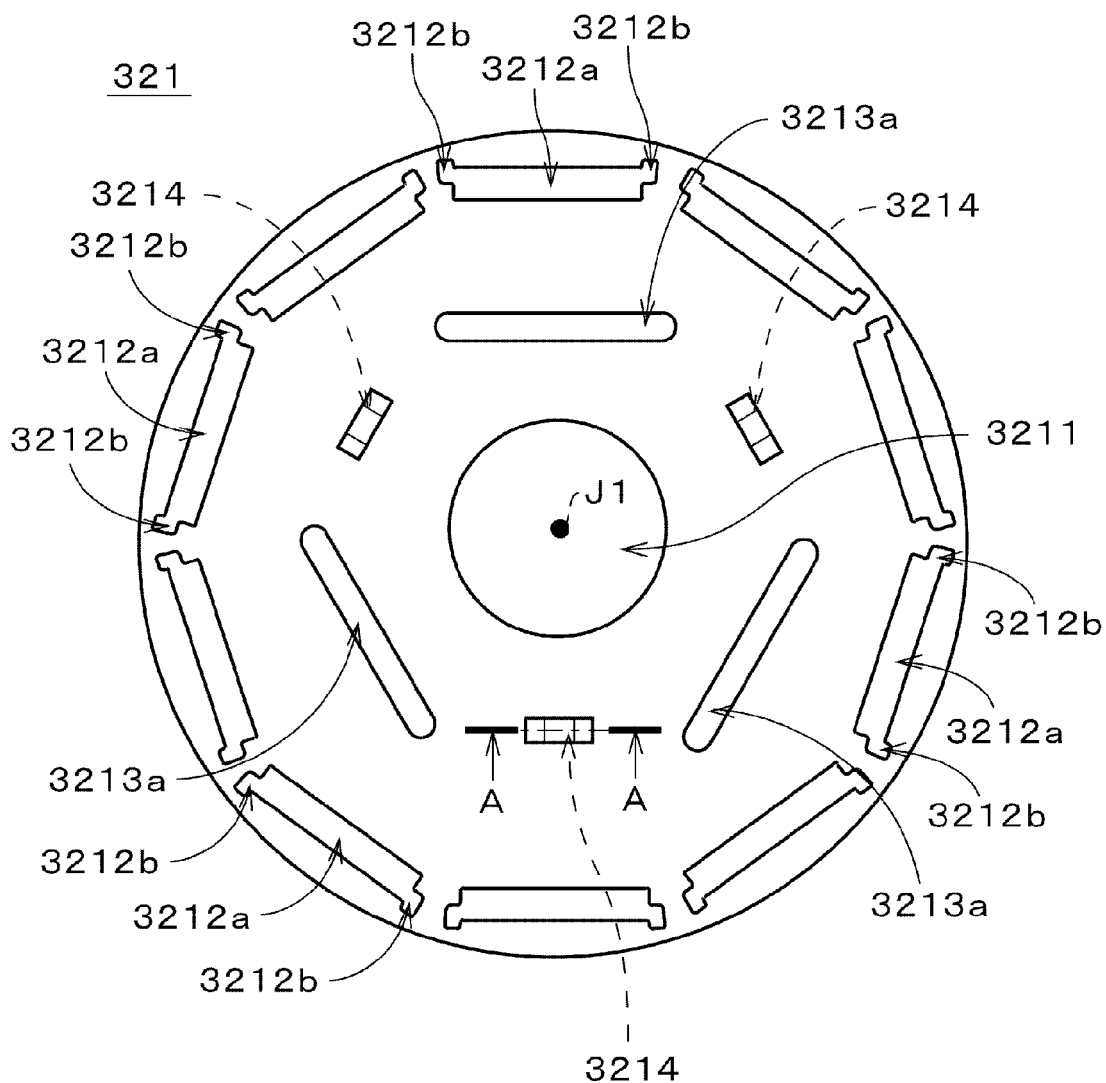
FIG. 5 is a plan view schematically showing a metal sheet in accordance with a preferred embodiment of the present invention.

Referring again to FIG. 1, the rotor core 32 is preferably formed by laminating substantially disk-shaped metal sheets 321 one above another along the central axis J1. FIG. 5 is a plan view schematically showing one of the metal sheets 321. Each of the metal sheets 321 has a substantially centrally located through-hole 3211 into which the shaft 31 is to be inserted. For example, ten magnet holding holes 3212a are defined inward from the outer circumference of each of the metal sheets 321 and arranged along the circumferential direction. The magnet holding holes 3212a correspond to the through-holes of the rotor core 32 arranged to hold the field magnets 33 in place. The magnet holding holes 3212a are slots extending substantially in the circumferential direction. Each of the magnet holding holes 3212a is provided at its opposite ends with outwardly-extending enlarged portions 3212b that prevent the magnetic flux from being short-circuited within the rotor core 32 when the field magnets 33 are arranged in the magnet holding holes 3212a.

Each of the metal sheets 321 has end plate fixing holes 3213a defined between the through-hole 3211 and the magnet holding holes 3212a. The end plate fixing holes 3213a are preferably three in number and are circumferentially arranged at an equal interval. The end plate fixing holes 3213a are slots extending perpendicularly or substantially perpendicularly to the radial direction. Each of the metal sheets 321 of the rotor core 32 except the lowermost one preferably has downwardly protruding protrusions 3214 provided between the end plate fixing holes 3213a adjacent to one another in the circumferential direction.

Figure 6:
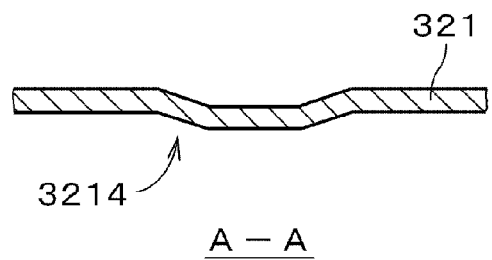
FIG. 6 is a section view schematically showing a protrusion in accordance with a preferred embodiment of the present invention.

FIG. 6 is a view schematically showing the cross-section of each of the protrusions 3214 taken along line A-A in FIG. 5. As shown in FIG. 6, each of the protrusions 3214 is preferably formed by press working. Each of the protrusions 3214 has slanting portions inclined downwards from the substantially circumferential opposite ends thereof and a planar bottom portion positioned between the slanting portions. The slanting portions and the planar bottom portion extend continuously from the body of each of the metal sheets 321. The downwardly protruding size of each of the protrusions 3214 is equal to or smaller than the thickness of one of the metal sheets 321. A downwardly depressed recess is defined on the upper surface of each of the protrusions 3214. The recess has a shape conforming to the shape of the lower surface of each of the protrusions 3214. In the lowermost one of the metal sheets 321 of the rotor core 32, instead of the protrusions 3214, hole portions extending from the upper surface to the lower surface are preferably formed by press working.

Figure 7:
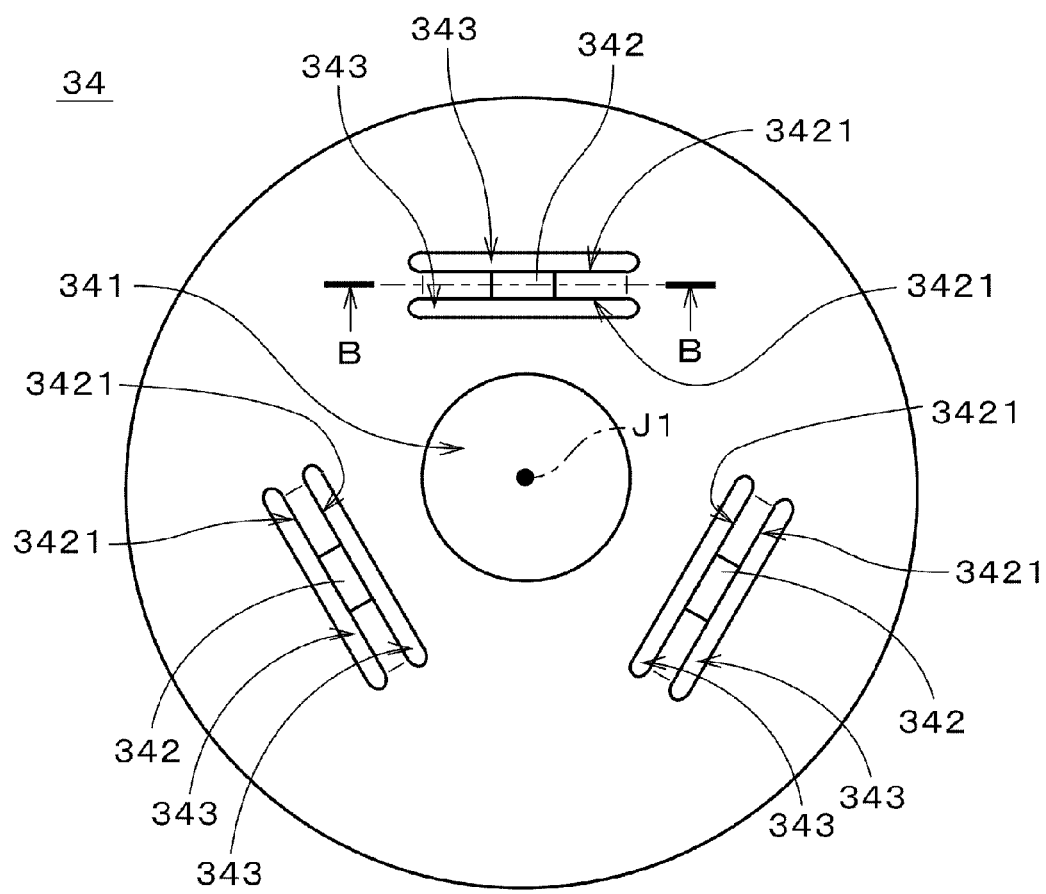
FIG. 7 is a plan view schematically showing an end plate in accordance with a preferred embodiment of the present invention.

FIG. 7 is a plan view schematically showing the end plate 34 attached to the upper surface of the rotor unit 3. The end plate 34 attached to the lower surface of the rotor core 32 is structurally the same as the end plate 34 attached to the upper surface of the rotor core 32. The end plate 34 is arranged in a substantially disk-like shape and has a substantially centrally located hole portion 341 into which the shaft 31 is inserted, a plurality of slot portions 343 and a plurality of bent portions 342. The slot portions 343 are preferably arranged in pairs at three points equally spaced along the circumferential direction, each pair of the slot portions 343 being arranged side by side in the radial direction. The respective slot portions 343 extend perpendicularly or substantially perpendicularly to the radial direction. Each of the bent portions 342 is arranged between, and extends parallel or substantially parallel to, each pair of the radially arranged slot portions 343. Each of the bent portions 342 continuously extends from the body of the end plate 34.

The slot portions 343 are preferably formed by punching the end plate 34 through press working. The bent portion 342 has side surfaces 3421 exposed radially inwards and outwards. The side surfaces 3421 are defined by two cut surfaces created when press-forming the slot portions 343. The side surfaces 3421 are positioned so that they can overlap with the radially opposing sides of each of the end plate fixing holes 3213a of the metal sheets 321. The bent portion 342 can be bent by press working to protrude from the body of the end plate 34 toward the rotor core 32. In other words, the bent portions of the end plate 34 arranged on the upper surface side of the rotor core 32 can be bent downwards, and the bent portions of the end plate 34 arranged on the lower surface side of the rotor core 32 can be bent upwards.

Figure 8:
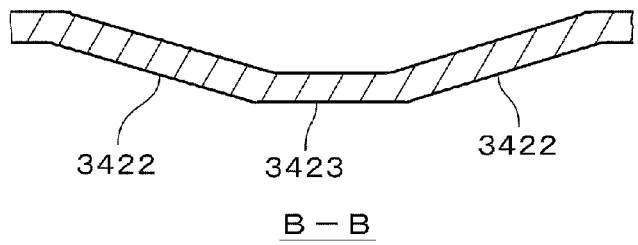
FIG. 8 is a section view schematically showing a bent portion in accordance with a preferred embodiment of the present invention.

FIG. 8 is a view schematically showing the cross-section of the bent portion 342 taken along line B-B in FIG. 7. As shown in FIG. 8, the bent portion 342 has slanting portions 3422 inclined downwards from the substantially circumferential opposite ends thereof and a planar portion 3423 positioned between the slanting portions 3422.

Figure 9:
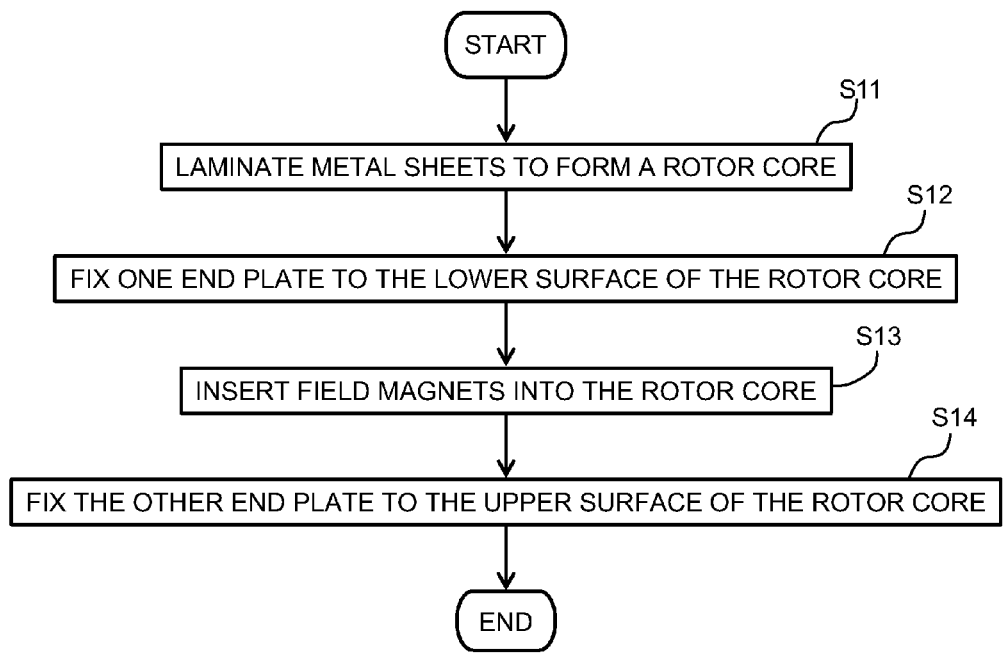
FIG. 9 is a flowchart illustrating a rotor unit manufacturing method in accordance with a preferred embodiment of the present invention.
Figure 10:
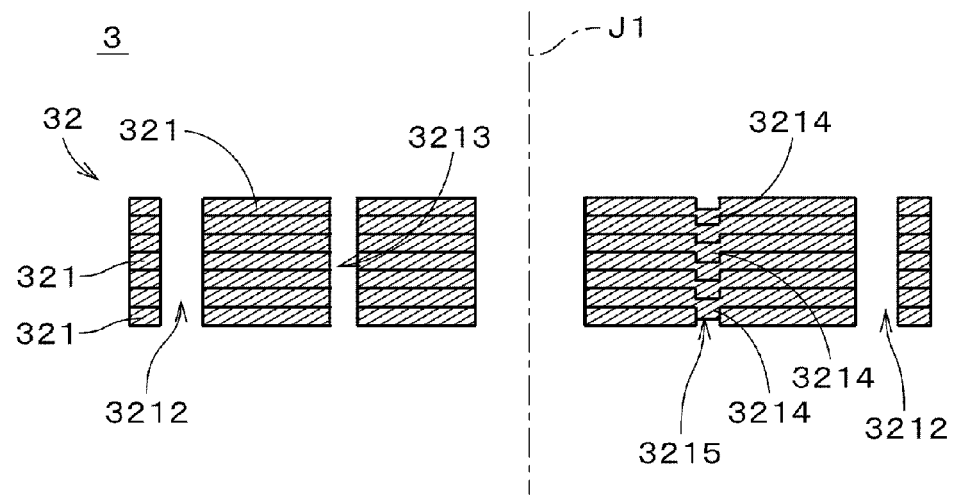
FIG. 10 is a section view schematically showing a rotor unit undergoing a manufacturing process in accordance with a preferred embodiment of the present invention.
Figure 11:
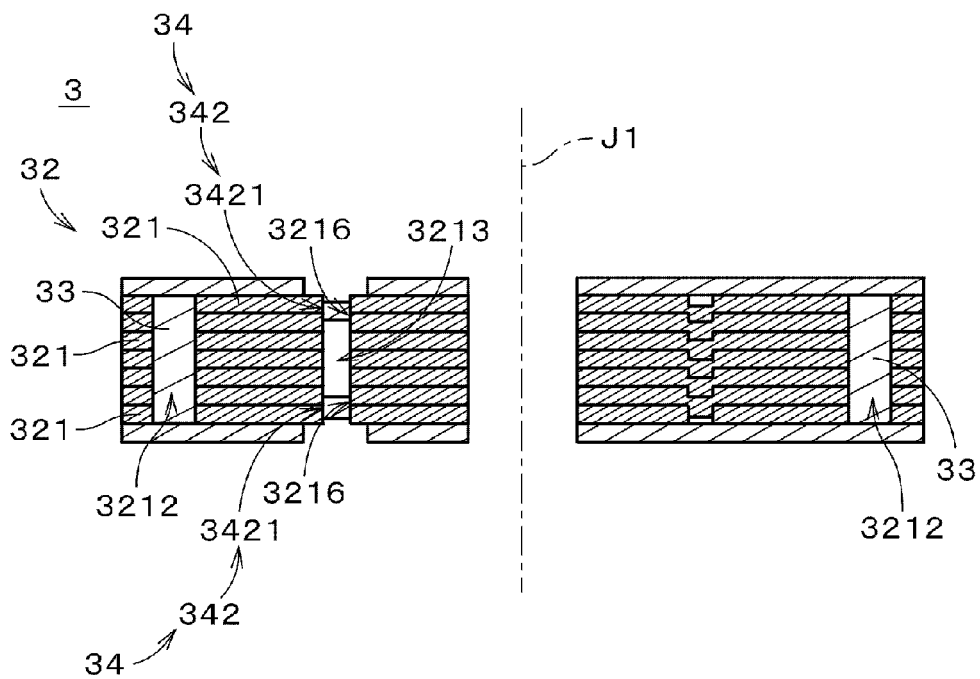
FIG. 11 is another section view schematically showing the rotor unit undergoing the manufacturing process in accordance with a preferred embodiment of the present invention.

FIG. 9 is a flowchart illustrating a method for manufacturing the rotor unit 3. FIGS. 10 and 11 are views schematically showing the rotor unit 3 undergoing a manufacturing process. The shaft 31 is omitted from illustration in FIGS. 10 and 11. As can be seen in FIG. 10, the protrusions 3214 of each of the metal sheets 321 are press-fitted into the respective recesses defined on the upper surfaces of the protrusions 3214 of the lower adjoining metal sheet 321, at which time the radial side surfaces of the protrusions 3214 make contact with the radial inner surfaces of the recesses. Press-fitted into the hole portions 3215 of the lowermost metal sheet 321 of the rotor core 32 are the respective protrusions 3214 of the metal sheet 321 lying just above the lowermost metal sheet 321. Consequently, the respective metal sheets 321 are coupled together to provide a substantially columnar rotor core 32 having the metal sheets 321 laminated one above another (step S11).

The ten magnet holding holes 3212a of the respective metal sheets 321 coincide in position with one another. When the metal sheets 321 are laminated one above another, the magnet holding holes 3212a of the respective metal sheets 321 are aligned with one another in the vertical direction. Thus, through-holes extending parallel or substantially parallel to the central axis J1 are defined in the rotor core 32. Hereinafter, these through-holes will be referred to as "magnet holding holes 3212". The magnet holding holes 3212 are preferably circumferentially arranged at ten points inside the outer circumference of the rotor core 32 corresponding to the outer surface thereof. Similarly, as the metal sheets 321 are laminated one above another, the end plate fixing holes 3213a arranged at three points are aligned with one another in the vertical direction. Thus, through-holes extending parallel or substantially parallel to the central axis J1 are defined in the rotor core 32. Hereinafter, these through-holes will be referred to as "end plate fixing holes 3213". In other words, the rotor core 32 has the openings of the magnet holding holes 3212 and the openings of the end plate fixing holes 3213 defined on the upper and lower surfaces thereof.

Next, one of the end plates 34 is arranged on one axial end surface, i.e., the lower surface, of the rotor core 32 as shown in FIG. 11. Then the bent portions 342 are press-fitted into the respective end plate fixing holes 3213, at which time the opposite side surfaces 3421 of the bent portions 342 make contact with the inner surfaces 3216 of the end plate fixing holes 3213. As a result, the end plate 34 is fixed to the lower surface of the rotor core 32 (step S12). Subsequently, the field magnets 33 are inserted into the respective magnet holding holes 3212 (step S13).

Once the field magnets 33 are inserted into the magnet holding holes 3212 of the rotor core 32, the other end plate 34 is arranged on the other axial end surface, i.e., the upper surface, of the rotor core 32. Then the bent portions 342 are press-fitted into the respective end plate fixing holes 3213, at which time the opposite side surfaces 3421 of the bent portions 342 make contact with the inner surfaces 3216 of the end plate fixing holes 3213. As a consequence, the other end plate 34 is fixed to the upper surface of the rotor core 32 (step S14). The two end plates 34 thus attached to the rotor core 32 cover the openings of the magnet holding holes 3212 arranged on the upper and lower surfaces of the rotor core 32, thereby preventing the field magnets 33 from being removed out of the magnet holding holes 3212.

Figure 15:
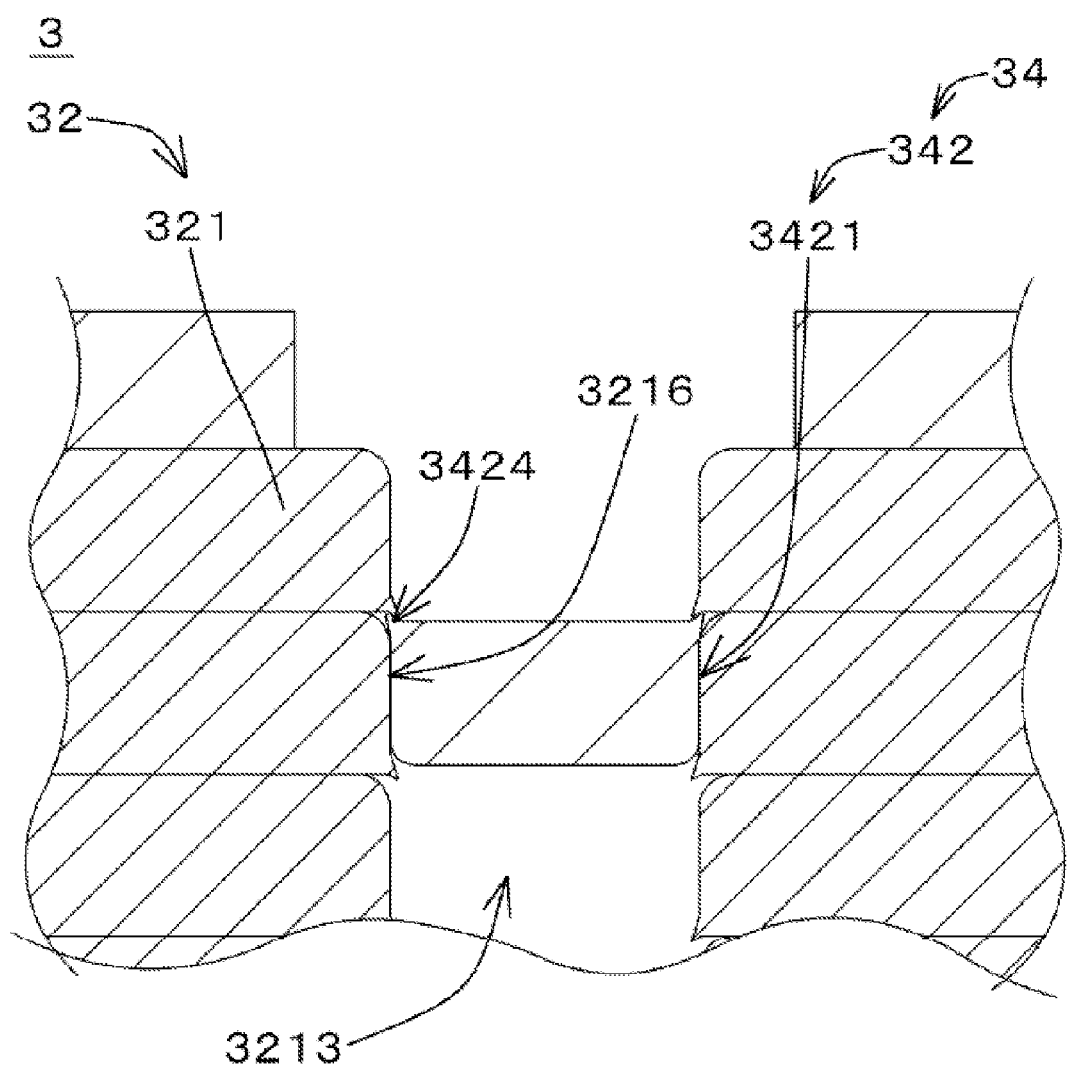
FIG. 15 is a schematic enlarged drawing showing the arrangement of a bent portion that has been press fitted into the end plate fixing holes.

When forming the bent portions 342 by press working, burrs 3424 (as shown in FIG. 15) directed toward the body of the end plate 34 (directed upwards in FIG. 8) are defined on the side surfaces 3421 of the bent portions 342. It is to be noted that, for the sake of clarity, the burrs 3424 in FIG. 15 have been depicted as being much larger than their actual size with respect to their surroundings. This makes it possible to increase the frictional resistance between the inner surfaces of the end plate fixing holes 3213 and the side surfaces 3421 that acts against removal of the end plate 34. Therefore, the end plate 34 is strongly fixed in place. The height of the bent portions 342 protruding from the body of the end plate 34 toward the rotor core 32 is greater than the thickness of the end plate 34. This sufficiently increases the contact area between the side surfaces 3421 of the bent portions 342 and the end plate fixing holes 3213, which makes it possible to strongly fix the end plate 34 in place. The fact that the end plate fixing holes 3213 are in slots assists in strongly fixing the end plate 34.

As described above, when manufacturing the rotor unit 3 of the motor 1, the bent portions 342 of the end plate 34 are press-fitted into the end plate fixing holes 3213 of the rotor core 32 as illustrated in FIG. 11. Accordingly, the end plate 34 arranged to prevent removal of the field magnets 33 can be easily fixed to the rotor core 32 without having to increase the axial size of the rotor unit 3. Use of the end plate 34 eliminates the need to provide a rotor cover on the radial outer side of the rotor, which makes it possible to reduce the gap between the rotor unit 3 and the stator unit 2.

Since the magnet holding holes 3212 and the end plate fixing holes 3213 of rotor core 32 are through-holes, the metal sheets 321 except the lowermost one are allowed to have the same shape. In the rotor core 32, the end plate fixing holes 3213a are positioned radially inwards of the magnet holding holes 3212a. This makes it possible to secure a great enough magnetic flux path between the field magnets 33 and the stator unit 2. The metal sheets 321 adjoining to each other are coupled together by press-fitting. The end plate 34 is also attached by press-fitting. Since the tasks of producing the rotor core 32 and attaching the end plate 34 are performed by press-fitting alone, it becomes easy to fabricate the rotor unit 3.

Figure 12:
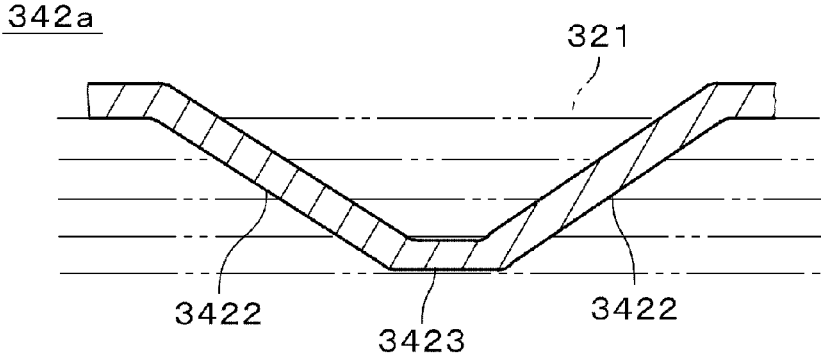
FIG. 12 is a section view schematically showing another example of a bent portion in accordance with a preferred embodiment of the present invention.

FIG. 12 is a section view schematically showing another example of the bent portion of the end plate 34 in accordance with the preferred embodiment of the present invention, which view corresponds to the section view shown in FIG. 8. Referring to FIG. 12, the bent portion 342a has slanting portions 3422 and a planar portion 3423 just like the bent portion 342 shown in FIG. 8. The height of the bent portion 342a protruding from the body of the end plate 34 toward the rotor core 32 is greater than the sum total of the thickness of the metal sheets 321 and the thickness of the end plate 34. Thus the side surfaces of the slanting portion 3422 make contact with the lower edge of at least one metal sheet 321 as indicated by double-dotted chain lines in FIG. 12. As in the bent portion 342 shown in FIG. 8, burrs 3424 directed toward the removal direction of the end plate 34 (upwards in FIG. 12) are defined on the side surfaces of the bent portion 342a when press-forming the bent portion 342a. This ensures that the burrs 3424 of the bent portion 342a are caught in the edges of the metal sheets 321, thereby strongly fixing the end plate 34 to the rotor core 32.

Figure 13:
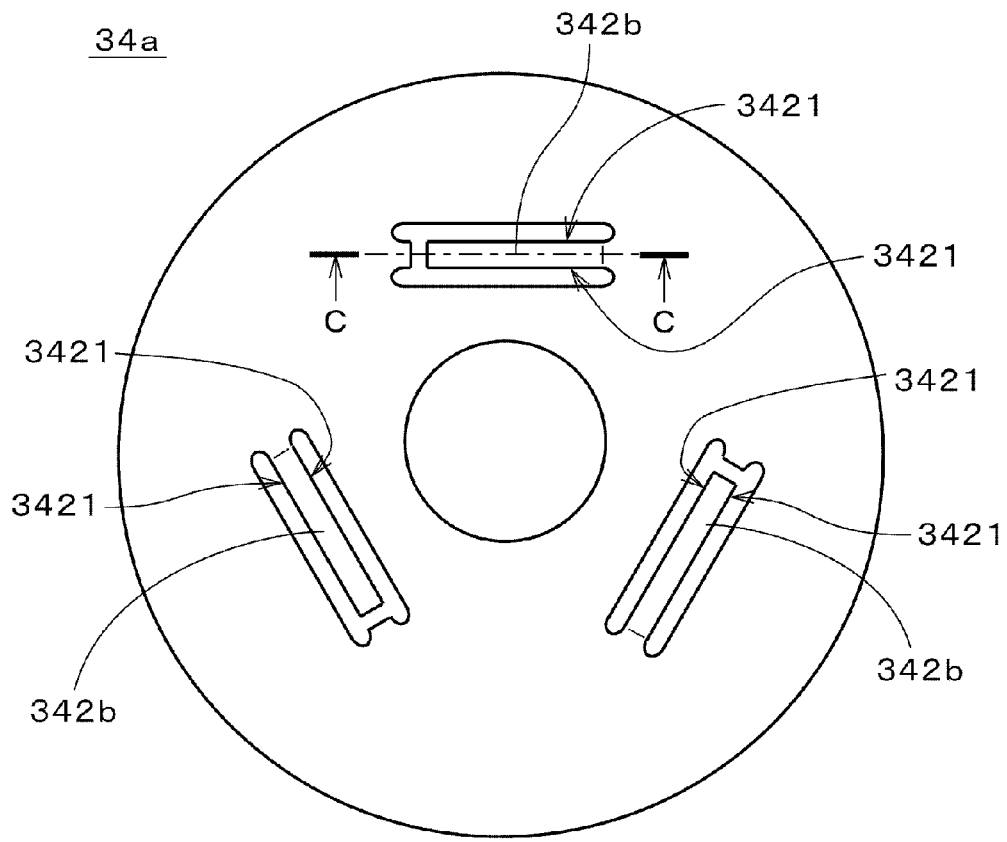
FIG. 13 is a plan view schematically showing another example of an end plate in accordance with a preferred embodiment of the present invention.
Figure 14:
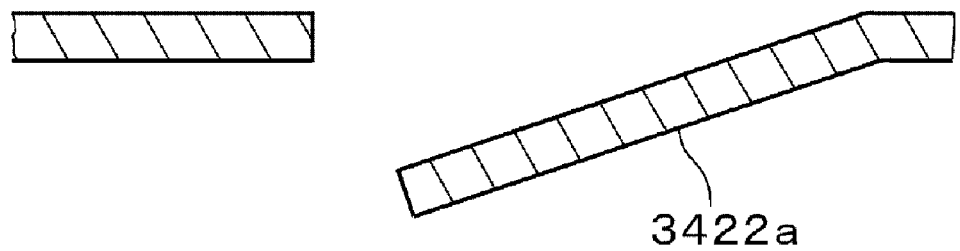
FIG. 14 is a section view schematically showing a bent portion of another example of an end plate in accordance with a preferred embodiment of the present invention.

FIG. 13 is a plan view schematically showing another example of the end plate in accordance with a preferred embodiment of the present invention. The end plate 34a shown in FIG. 13 is the same as the end plate 34 illustrated in FIG. 7, except that the former has a bent portion 342b differing in shape. FIG. 14 is a view schematically showing the cross-section of a bent portion 342b taken along line C-C in FIG. 13. The bent portion 342b extends perpendicularly or substantially perpendicularly to the radial direction. The bent portion 342b is provided with a cantilever type slanting portion 3422a continuously extending from the body of the end plate 34a and sloping downwards from one circumferential side (the right side in FIG. 14). The slanting portion 3422a lies between the side surfaces 3421 shown in FIG. 13. The side surfaces 3421 refer to the cut surfaces created when forming a slot corresponding to the slot 343 shown in FIG. 7 and overlap with the radial opposite sides of the corresponding end plate fixing hole 3213a shown in FIG. 5 when fabricating the rotor unit 3. The projecting height between the lower surface of the end plate 34a and the lower end portion of the bent portion 342b is greater than the thickness of the end plate 34a. Thus the end plate 34a is strongly fixed to the rotor core 32. More preferably, the projecting height of the bent portion 342b is greater than the sum total of the thickness of the end plate 34a and the thickness of the metal sheets 321.

Just like the bent portion 342 shown in FIG. 8, the bent portion 342b is preferably formed by cutting and bending the end plate 34a through press working. At this time, as is the case with the bent portion 342 shown in FIG. 8 and the bent portion 342a illustrated in FIG. 12, burrs 3424 directed from the side surfaces 3421 toward the body of the end plate 34a (upwards in FIG. 14) are defined on the side surfaces 3421 of the bent portion 342b when press-forming the bent portion 342b. This ensures that the end plate 34a is strongly fixed to the rotor core 32.

While certain preferred embodiments of the present embodiment have been described hereinabove, the present invention is not limited to these embodiments but may be modified in many different forms.

For example, it is not always necessary for the end plates 34 to fully cover the openings of the magnet holding holes 3212 as shown in FIG. 11. The openings of the magnet holding holes 3212 may be partially covered by the end plates 34 insofar as the removal of the field magnets 33 can be avoided. Furthermore, the present invention is not limited to the embodiment in which the end plates 34 are arranged on the upper and lower surfaces of the rotor core 32. For example, the lowermost metal sheet of the rotor core 32 may be configured without a hole portion, whereby the magnet holding holes 3212 and the end plate fixing holes 3213 are opened on the upper surface of the rotor core 32 but closed on the lower surface of the rotor core 32. In this case, one end plate 34 may be arranged only on the upper surface of the rotor core 32. In addition, the bent portion 342 may have a V-shape, in which case the cross-section of the bent portion 342 is defined by only two slanting portions. In the bent portion 342b shown in FIG. 14, the slanting portion 3422a may be modified to extend downwards substantially parallel to the central axis J1. The number of the end plate fixing holes 3213 and the number of the bent portions 342 are preferably three or more but may be, e.g., two or less.

It is not always necessary that the bent portion 342 of the end plate 34 shown in FIG. 7 be defined between the slots 343. As an alternative example, rectilinear cut lines may be formed in place of the slots 343 so that the bent portion 342 can be defined between the cut lines. The shape of the bent portion 342 and the slots 343 is not limited to the elongated one and may be, e.g., a square shape or other shapes. The tasks of laminating and coupling the metal sheets 321 may be performed by other methods, e.g., by a method of press-fitting a half-size protrusion of one metal sheet to another adjoining metal sheet.

The rotor core 32 shown in FIG. 10 may be defined by a single member and not by laminating the metal sheets 321 one above another. In case of the rotor core 32 shown in FIG. 10, the three hole portions defined on the upper and lower surfaces of the rotor core 32 to fix the end plates 34 in place are three identical through-holes, i.e., the end plate fixing holes 3213. Alternatively, it may be possible to employ end plate fixing holes that have upper and lower openings formed out of alignment with each other on the upper and lower surfaces of the rotor core 32 and therefore do not extend through the full thickness of the rotor core 32. The magnet holding holes 3212 may not be substantially parallel to the central axis J1 but may extend along the central axis J1 in such a manner as to have an inclination with respect to the central axis J1 in the circumferential direction. The steps of fabricating the rotor core 32 are not limited to the ones illustrated in FIG. 9. As an alternative example, the steps S12 and the following steps may be arbitrarily changed if so desired.

The motor 1 may be used in other applications than the power slide door for motor vehicles. For example, the motor 1 may be used as a driving power source of an oil pump for transmissions. It goes without saying that the motor 1 may be applied to other fields than the motor vehicles.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electric motor comprising:
    a stator unit including an annular armature; and a substantially columnar rotor unit located in the armature; wherein the rotor unit includes a rotor core having a plurality of magnet holding holes arranged along an outer surface of the rotor core and extending along a central axis of the armature, a plurality of field magnets located in respective ones of the magnet holding holes, and a first end plate arranged on a first axial end surface of the rotor core such that the first end plate at least partially covers openings of the magnet holding holes on the first axial end surface;

the rotor core has a plurality of end plate fixing holes arranged on the first axial end surface;

the first end plate has a body and a plurality of bent portions protruding from the body toward the rotor core;

the first end plate is fixed to the first axial end surface by the bent portions being arranged in respective ones of the end plate fixing holes such that cut surfaces of the bent portions contact inner surfaces of the end plate fixing holes;

the end plate fixing holes have a substantially circumferentially elongated shape; and each of the bent portions includes a plurality of slanting portions and a single planar portion.

2. The motor of claim 1, wherein a height of each of the bent portions is greater than a thickness of the first end plate.

3. The motor of claim 1, wherein the cut surfaces of the bent portions have burrs extending from the cut surfaces toward the body of the first end plate.

4. The motor of claim 1, wherein the end plate fixing holes are positioned radially inwards of the magnet holding holes.

5. The motor of claim 1, wherein the rotor core is defined by substantially flat metal sheets laminated one above another along the central axis.

6. The motor of claim 5, wherein a height of each of the bent portions is greater than a sum total of a thickness of the metal sheets and a thickness of the first end plate.

7. The motor of claim 5, wherein the metal sheets are coupled together by protrusions provided in one of the metal sheets being fitted into respective recesses provided in another one of the metal sheets.

8. The motor of claim 1, wherein the magnet holding holes define through-holes extending along the central axis;

the rotor unit further includes a second end plate arranged on a second axial end surface of the rotor core to at least partially cover openings of the magnet holding holes on the second axial end surface;

the second end plate has a body and a plurality of bent portions protruding from the body toward the rotor core;

the rotor core has a plurality of end plate fixing holes arranged on the second axial end surface; and the second end plate is fixed to the second axial end surface by the bent portions of the second end plate being arranged in respective ones of the end plate fixing holes provided on the second axial end surface such that cut surfaces of the bent portions of the second end plate contact inner surfaces of the end plate fixing holes provided on the second axial end surface.

9. The motor of claim 8, wherein the rotor core is defined by substantially flat metal sheets laminated one above another along the central axis;

the magnet holding holes extend along the central axis; and the end plate fixing holes provided on the first axial end surface and the end plate fixing holes provided on the second axial end surface are axially aligned.

\* \* \* \* \*